Patented Oct. 4, 1938

2,132,160

UNITED STATES PATENT OFFICE 2,132,160

MANUFACTURE OF SHAPED ARTICLES

Max Hagedorn, Dessau in Anhalt, Germany, assignor to Agfa Ansco Corporation, Binghamton, N. Y., a corporation of New York No Drawing. Application February 14, 1935, Serial No. 6,489. In Germany February 16, 1934

15 Claims. (Cl. 106—22)

My present invention relates to the manufacture of shaped articles such as films or threads.

One of its objects is an improved process of manufacturing shaped articles such as films or threads. Another object is the shaped articles produced by my improved process. Still another object is the softening agents used in my improved process. Further objects will be seen from the detailed specification following hereinafter.

The use of esters having long chains and derived from polyhydric alcohols, more particularly glycerin and glycol, as softeners for plastic masses is known. The use of these esters, however, involves a number of drawbacks. Polyhydric alcohols which have been partially esterified, such as butylene-glycol monostearate or 1:2-glycerine dilaurate have a certain affinity for water owing to the presence of non-esterified hydroxyl groups. When used as additions to plastic masses, they increase the sensitivity of the masses to water, a result which in many cases is undesirable. Though the completely esterified alcohols have a lower affinity for water, their preparation in the pure state, necessary, for instance, when they are to be used for photographic purposes, is often hindered by their rather high boiling points and their low capacity for crystallizing. Furthermore, they all become rancid more or less quickly, often with a change in color, a behaviour which must be ascribed to a decomposition caused by autooxidation or by bacteria or ferments or otherwise.

According to the invention, these drawbacks are overcome by exchanging in the polyhydric alcohol one or more hydroxyl groups for halogen and esterifying the remaining hydroxyl groups with an aliphatic carboxylic acid containing at least 8 carbon atoms in an unbranched chain. Such esterified mono- or polyhalogenhydrins are insensitive to water and may easily be purified by distillation. Owing to their contents of halogen, they do not become rancid; furthermore, their inflammability is appreciably lower than that of compounds containing no halogen.

According to the particular purpose for which the esters are intended, there are used esters having one or more halogen atoms and having similar or dissimilar radicals of fatty acids containing a long chain. Their compatibility with plastic masses capable of forming films, for instance with cellulose esters or polymerization products, is often enhanced in proportion as the number of the halogen atoms increases. Better values of elongation are obtained by means of many ester compounds having a long chain.

There have proved to be especially suitable for the esterification mixtures of fatty acids obtainable from natural, vegetable or animal fats and oils, such as cocoanut oil, palm nut oil, tallow, and so on. More highly unsaturated fatty acid mixtures, such as are derived from linseed oil or wood oil, are also very suitable. The softening agents used according to the invention must not contain free hydroxyl groups.

The esters of halogen-substituted polyhydric alcohols and naphthenic acids have similar very good properties as softeners. The naphthenic acids, which in respect of their properties and most probably also of their constitution closely resemble the aliphatic carboxylic acids having a long chain are therefore to be regarded as acids of this kind and as within the scope of the invention.

For imparting to the cellulose derivatives special properties it is useful in some cases to use the softeners of the present invention in conjunction with other softeners, filling materials or additions of any kind. The parent materials applicable for the manufacture of films, threads and shaped articles according to the invention are principally cellulose derivatives and other plastic masses. The invention includes the manufacture of sheets which are to be used as such as well as sheets which are to be applied to carriers or supports.

The following examples illustrate the invention:

1. 300 grams of polyvinyl chloride containing 63–65 per cent. of Cl are dissolved together with 60 grams of ethylene chlorhydrin naphthenate in a mixture of 350 grams of benzene and 350 grams of acetone, while stirring. The solution so obtained is filtered and cast in known manner by means of a film casting machine to form a film of $20\mu$ thickness.

2. To a solution of 18 per cent. strength prepared by dissolving nitro-cellulose (containing 12,2 per cent. of nitrogen) in a mixture of ether and alcohol (mixed in the proportion of 3:1) is added a quantity of monochlorhydrine distearate amounting to 20 per cent. calculated on the nitrocellulose. The solution is cast in known manner to form a film of $130\mu$ thickness which, as compared with a nitrocellulose film containing 15–20 per cent. of camphor, has double the creasing number, a somewhat improved elongation and an equal strength. The percentages are percentages by weight. The elongation of the film in water is about one third of that of a film obtainable by using a stearic acid ester of glycerin still containing a free hydroxyl group.

3. To a solution of 18 per cent. strength obtained by dissolving cellulose acetate (containing 57 per cent. of acetic acid) in a mixture of methylene chloride, chloroform and amyl alcohol (mixed in the proportion of 10:7:1,5) is added a quantity of the ester from the fatty acids of cocoanut oil and dibromhydrin

wherein R represents the residue of cocoanut oil fatty acids) amounting to 20 per cent. calculated on the cellulose acetate. A film of 130μ thickness prepared by casting this solution in known manner has a creasing number and an elongation which are considerably higher than those of a film of cellulose acetate prepared with use of a mixture of triphenylphosphate and dimethyl phthalate (in the proportion of 3:1) as a softener in a quantity amounting to 20 per cent. calculated on the cellulose acetate.

4. The condensation product from polyvinyl alcohol and acetaldehyde is dissolved in methylene dichloride to form a solution of 15 per cent. strength and the solution is mixed with 15 per cent. of monochlorhydrinerythrite tripalmitate, calculated on the weight of the condensation product. The solution is formed in known manner into a film which in comparison with a film made without such addition, has the advantage of an increased elongation and a very high creasing number.

The carboxylic acids from which are derived the esters used as softening agents in accordance with the invention may be substituted in the unbranched chain of at least eight carbon atoms by an aromatic or hydroaromatic residue.

What I claim is:

1. An article of definite shape comprising an organic colloid selected from the group consisting of synthetic resins and film forming cellulose derivatives and as a softening agent a halogen hydrine the free hydroxyl groups of which have been esterified by an aliphatic acid having an unbranched chain of at least 8 carbon atoms.

2. A film comprising an organic colloid selected from the group consisting of synthetic resins and film forming cellulose derivatives and as a softening agent a halogen hydrine the free hydroxyl groups of which have been esterified by an aliphatic acid having an unbranched chain of at least 8 carbon atoms.

3. A film comprising polyvinyl chloride containing 63 to 65 per cent. of chlorine and as a softening agent ethylene chlorhydrine naphthenate.

4. A film comprising nitrocellulose and as a softening agent monochlorhydrine distearate.

5. A film comprising cellulose acetate and as a softening agent the ester from the fatty acids of cocoanut oil and dibromhydrine.

6. The process of plasticizing organic colloids selected from the group consisting of synthetic resins and film forming cellulose derivatives which comprises incorporating therein a halogen hydrine, the free hydroxyl groups of which have been esterified by an aliphatic acid having an unbranched chain of at least eight carbon atoms.

7. The process of plasticizing organic colloids selected from the group consisting of synthetic resins and film forming cellulose derivatives which comprises incorporating a halogen hydrine, the free hydroxyl groups of which have been esterified by an aliphatic acid having an unbranched chain of at least eight carbon atoms, in a solution of such colloid in an organic solvent therefor.

8. The process of plasticizing polyvinylchloride containing 63 to 65 per cent. of chlorine which comprises incorporating therein ethylene chlorhydrine naphthenate.

9. The process of plasticizing nitrocellulose which comprises incorporating therein monochlorhydrine distearate.

10. The process of plasticizing cellulose acetate which comprises incorporating therein the ester from the fatty acids of cocoanut oil and dibromhydrine.

11. A composition of matter comprising an organic colloid selected from the group consisting of synthetic resins and film forming cellulose derivatives and a halogen hydrine, the free hydroxyl groups of which have been esterified by an aliphatic acid having an unbranched chain of at least eight carbon atoms.

12. A composition of matter comprising an organic colloid selected from the group consisting of synthetic resins and film forming cellulose derivatives, an organic solvent therefor and a halogen hydrine, the free hydroxyl groups of which have been esterified by an aliphatic acid having an unbranched chain of at least eight carbon atoms.

13. A composition of matter comprising polyvinylchloride containing 63 to 65 per cent. of chlorine and ethylene chlorhydrine naphthenate.

14. A composition of matter comprising nitrocellulose and monochlorhydrine distearate.

15. A composition of matter comprising cellulose acetate and the ester from the fatty acids of cocoanut oil and dibromhydrine.

MAX HAGEDORN.